Patented July 23, 1940

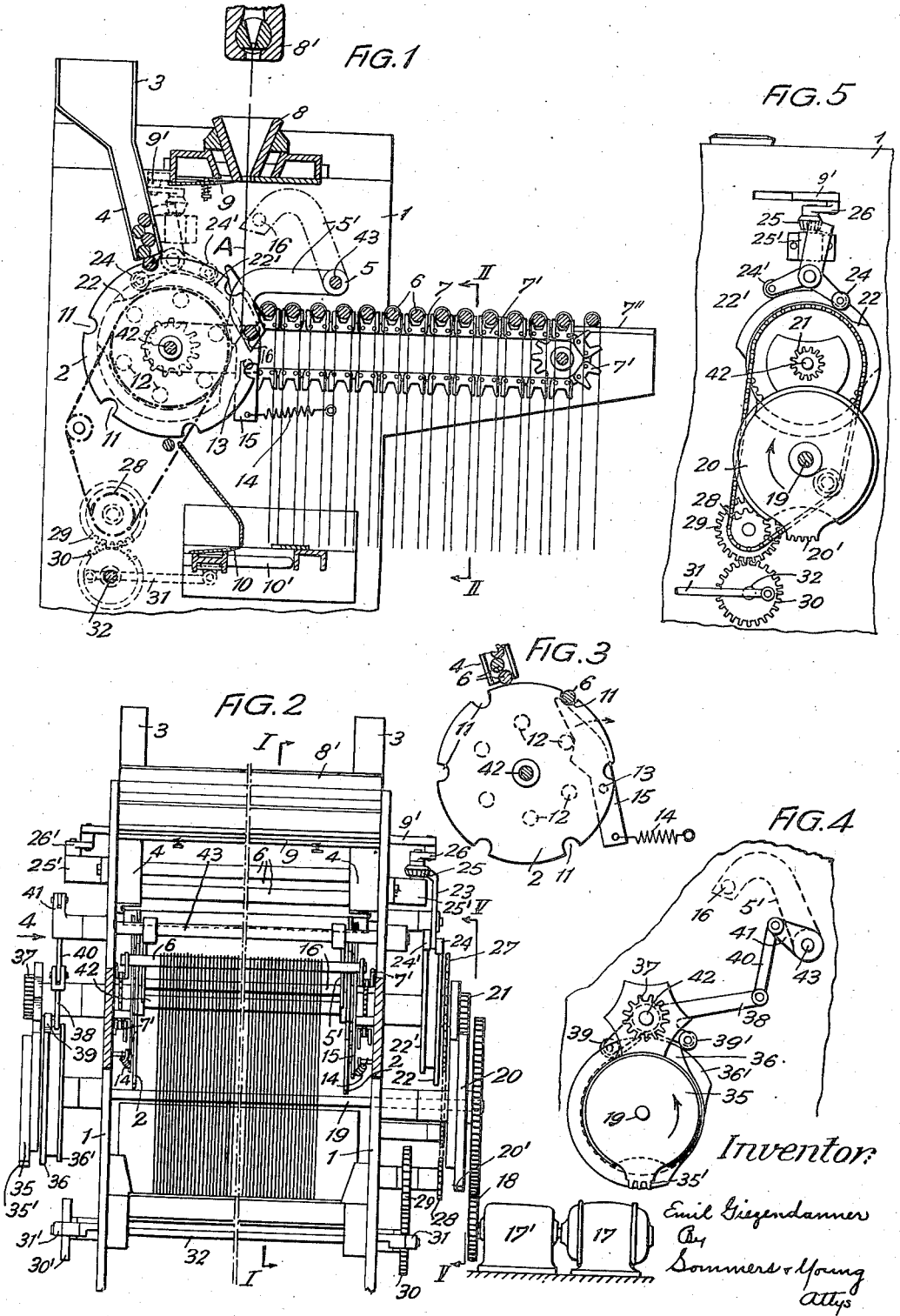

2,208,900

UNITED STATES PATENT OFFICE 2,208,900

DRIER FOR DOUGH STRINGS FED THERETO AND CUT INTO PORTIONS LOOPED ON BARS

Emil Giezendanner, Uzwil, Switzerland, assignor to Gebrüder Bühler, Uzwil, Switzerland Application June 14, 1939, Serial No. 279,183 In Germany April 8, 1939

3 Claims. (Cl. 107—7)

This invention relates to apparatus for producing dried dough strings, such as spaghetti, macaroni or the like, cut into portions of the type in which the strings are looped on bars in spaced relation for drying.

It is conventional to hang flour paste articles, such as spaghetti, macaroni and the like, on grates, with the articles suspended from the bars of the grate in spaced relation for drying the same. To this end it is required that the string portions into which the articles to be suspended are cut shall be arranged on the bars at small distances apart, with a view to completely utilizing the available space presented by the bars, and that these portions shall be of equal lengths throughout, this being essential not only for the complete utilization of the available space of the drying chambers but also for the satisfactory packaging of the flour paste articles.

In the past, it was usual to distribute the flour paste articles to the bars of the grate by hand and to provide a small excess length for the string portions, in order to provide for cutting these portions into a uniform length only after they have been arranged. This mode of procedure has the disadvantage of requiring a considerable amount of hand work, which is undesirable for hygienic reasons. Furthermore, much loss by waste is suffered by the trimming of the ends of the string portions.

The object of the present invention is to avoid these drawbacks by looping the strings of flour paste articles fed at a uniform speed on the bars automatically, without handling the material.

This is accomplished in the dough string drier, according to the invention, by arranging in advance of a movable drying grate provided with loosely inserted bars on which the dough strings are to be hung a device for successively supplying said bars as they are to be inserted toward the grate, which device cooperates with a dough string deflecting device which automatically loops the dough strings on the bar last inserted in the grate, prior to the dough strings being cut into string portions.

In the accompanying drawing an embodiment of the invention is illustrated by way of example only, in which Fig. 1 is a vertical longitudinal sectional view of the drier on the line I—I in Fig. 2;

Fig. 2 is a sectional view on the line II—II in Fig. 1;

Fig. 3 is a view of a detail of Fig. 1 with certain parts in different positions;

Fig. 4 is a view of a part of the drier as seen from the left hand side of Fig. 2, and Fig. 5 is a sectional part view on the line V—V in Fig. 2.

Referring to the drawing, the drier is provided with a machine frame 1 in which a grate bar supply device 2 is arranged which is associated with a bar magazine 3 connected with the bar supply device through a delivery chute 4. The machine frame further carries a dough string deflecting device 5, a movable grate 7 formed of loosely inserted carrier bars 6 on which the dough strings are looped, an oblong entrance funnel 8 for guiding the dough strings supplied to the drier in a row of spaced string portions through a sizing head 8' of a machine for producing flour paste articles (not shown). With the funnel 8 is associated an upper cutter blade 9 extending longitudinally thereof and reciprocating transversely to the longitudinal direction of the blade. In the lower part of the machine frame 1 is arranged a lower vertically adjustable cutter blade 10 so as to be reciprocable transversely to the row of dough strings.

The relative arrangement of the devices 2 to 4, 5, 7 and 9 is such that the bar supply device 2, which releases the bars automatically from the bar magazine 3 to which the bars are continually supplied by means not shown and slide down through the delivery chute 4 by gravitational action, is positioned in advance of the movable grate. This bar supply device cooperates with the deflecting device 5 in such manner that the device 5 automatically loops the dough strings fed on that bar of the series of bars successively supplied to the grate by the bar supply device which is last inserted in the grate before the string sections to be dried are severed from the strings by the upper knife 9.

To this end the exit of the chute 4 overlies two discs 2 provided with circumferential notches 11 which discs are arranged on a common shaft 42 and disposed on both sides of the machine frame interiorly thereof. The notches 11 provided in the discs 2 are of a shape corresponding to that of the bars 6 and oppose each other in the axial direction so that each pair of opposing notches is adapted to receive the ends of a bar 6 sliding down through the magazine 3. Within each sector of the discs 2 defined by two adjacent notches 11 a roller 12 is arranged, the pairs of oppositely disposed rollers on the two discs cooperating successively with two levers 15 which are rockably mounted on bolts 13 within the machine frame on both sides of the latter, exteriorly of the discs 2, and are loaded by springs 14.

Two lever arms 5′, which are swingably mounted in the frame 1 and the outer ends of which are bent toward the notched discs are interconnected by a rod 16 so that a stirrup-like deflecting device is formed thereby, which enters between the notched discs when swinging toward the front end of the drier, to the left in Fig. 1. The movable grate 7 is provided with two link-chain-like conveyor members 7 which run over sprocket wheels that are mounted in the interior of the machine frame laterally thereof, the front rollers being mounted on the shaft 42 of the bar supply device beyond the range of movement of the rollers 12. The links 7′ of the conveyor chains 7 are provided with recesses at the circumference of these chains for clampingly holding the ends of the grate bars 6 and thereby preventing the bars from rotating about their axes.

The drive of the movable grate is positively effected from the bar supply device and thus in time with the discs 2, due to the fact that the front sprockets of the conveyor chains are fixed to the shaft 42.

Hereinafter the driving arrangement of the drier will be more explicitly described.

This arrangement is driven by a driving device composed of an electric motor 17 and a gearing 17′ the speed of which is infinitely variable through the intermediary of a pair of gears 18 and a counter drive shaft 19, the speed of which in turn is dependent upon the velocity at which the dough strings emanate from the sizing head 8′ and upon the length required for the string portions. The shaft 19 makes one revolution during the time required for the operation of hanging a grate bar with string portions.

The shaft 42 is driven by the shaft 19 by means of an intermittent or Maltesian drive 35, 37. The pinion 37 is fixed on the shaft 42 and the wheel 35 is fixed on the shaft 19 and has but a limited number of gear teeth for cooperation with this pinion. The intermittent drive is so designed that the discs 2 rock during one revolution of the wheel 35 through an angular range which corresponds to the angle at the centre of the sector defined by two consecutive notches 11.

On the shaft 42 is loosely mounted a three-armed lever 38 the two short arms of which each carry a guide roller 39 which rollers cooperate with two cams 36, 36′, respectively, which are so shaped that the lever 38 rocks positively to and fro during each rocking movement of the shaft 42, thereby moving the lever arm 5′ and thus the stirrup-shaped deflecting device, by means of link 40, lever arm 41 and rocking shaft 43, toward the front and into the full line position in Fig. 1 and back again into its chain-dotted inoperative position in time with the driving arrangement of the drier.

On the shaft 42 is loosely mounted a pinion 21 to which are connected two cams 22, 22′ each cooperating with a three-armed rocking lever 23 by means of two guide rollers 24, 24′, respectively, each mounted on one of the shorter arms of this lever. The longer arm of the lever 23 carries a toothed portion meshing with a bevel gear pinion 25 rotatably mounted in a bearing 25′ and carrying a crank arm 26 which is pivotally connected to a backing plate 9′ of the cutter blade 9. The pinion 21 cooperates with a toothed portion 20′ of a wheel 20 which is fixed to the shaft 19. The intermittent or Maltesian drive comprising the wheels 20, 21 is so designed that as the shaft 19 makes one revolution the pair of cams 22, 22′ rocks through an angular range of only 180°. Therefore, the cutter blade 9, which is guided in parallelism with the funnel 8 by means of a crank arm 26′ mounted on the frame 1 in opposition to the crank 26 (Fig. 2), is positively driven by the driving arrangement of the drier to move through one traverse and thus to perform a single cutting operation at each revolution of the shaft 19 by action of one of the cams 22, 22′. Consequently, the cutter blade 9 returns into initial position by action of the other cam only during the time in which the next grate bar is charged with dough material.

The lower cutter blade 10 can also be positively actuated in time with the driving arrangement of the drier by means of a chain drive 27, 28 interposed between the pair of cams 22, 22′, to which the chain wheel 27 is fixed, and a transmission wheel 29 cooperating with a toothed disc 30 fixed to a shaft 32 and forming a crank drive together with a connecting rod 3 (Figs. 1 and 2). On the opposite end of the shaft 32 is mounted a corresponding crank drive 30′, 31′ (Figs. 2 and 5). The crank drives 30, 31 and 30′, 31′ act on a support of the cutter blade 10 by means of the connecting rods 31, 31′ for reciprocating this support longitudinally of the machine frame 1 in lateral guides 10′ thereof so that when the chain drive 27, 28 is connected (by coupling means not shown) the ends of the string portions looped on the bars 6 can be trimmed. Since the arrangement is such that the cutter blade 10 completes a reciprocating movement while the pair of cams 22, 22′ makes one revolution, this trimming operation is effected in time with the operation of inserting the bars 6 in the movable grate.

The infinitely variable speed gearing 17′ serves for adapting the speed of the drier to the velocity at which the dough strings are supplied by the machine producing the same, in order to provide for a uniform length of string portions discharging from the drier during the whole time of operation thereof without extra trimming of the string ends being required.

The operation of the drier is as follows:

At the beginning of a turning movement of the notched discs 2 in the clockwise direction in Fig. 1, after the dough strings A have been projected out of the entrance funnel 8 for a certain length, the bar 6, having slid down into one of the notches 11 of the discs 2 then underlying the exit of the chute 4, is moved in time with these discs while the other bars present in the chute are retained therein by the edge of the discs wiping across the said exit. Since the rollers 12 move in unison with the discs 2 the lever 15 at first remains with its outer surface beneath the path of the bar 6 supplied by the chute 4, due to the action of the tension spring 14 urging the lever on the respective roller 12, whereby the latter cooperates with the inner side of the lever 15 forming a cam guide for this roller (Fig. 3).

As the turning movement of the lever 15 toward its position shown in Fig. 1 is continued, the bar 6 is lifted out of the notches of the discs 2 and is moved toward the web A of dough strings fed to such an extent that this bar slides down into the recesses in the respective two opposing chain links 7′ of the link-chains 7. By this means the web of dough strings is deflected from the vertical position into an oblique position which extends tangentially of the circumference of the grate bar 6 last inserted in the link-chains. At the same time the stepwise turning movement of the notched discs is interrupted.

Thereupon, the deflector stirrup 5 starts to rock in the counterclockwise direction as shown in Fig. 4, so that the rod 16 engages the web of dough from the side opposite to that on which it had been engaged by the slidingly descending bar 6, thereby deflecting the continuously moving web of dough across this bar. On the web of dough thus having been looped on the bar 6, the deflector stirrup 5 rocks back into its initial position shown in chain-dotted lines in Figs. 1 and 4, whereupon the strings are cut into portions of the required length by the upper cutter bar 9.

In starting the drier, it frequently happens that, while the parts of the same contacting with the flour paste material are not yet sufficiently heated, the dough strings fed in spaced relation in a row do not all travel at the same velocity. The presence of the lower cutter blade 10 permits the bars to be charged with string portions of uniform length already from the start. In this event the string portions are purposely given an initial length which is in excess of the required length and the excess lengths are then cut off by the lower cutter blade. After the said parts are heated to a temperature as necessary for the continual operation of the drier, so that the strings travel at a satisfactorily uniform velocity, the drier is adjusted for having the grate bars hung with string portions of required length, and the lower cutter blade is set at rest.

The cutter blade last referred to may also be used when a uniformity of length of the string portions of such a high degree of accuracy is required as can not be obtained by means of the other parts of the drier alone. The lower cutter blade 10 for cutting the string portions to a uniform length, which as aforesaid is arranged in the frame 1 so as to be adjustable as to height, can be adjusted to various different lengths of string portions.

On arriving at the delivery end of the drying grate 7 the bars charged with dough material are automatically pushed from the recesses in the links of the link-chains by means of wedge-like members 7" which are arranged at this end of the grate so as to allow the grate bars to ride up on these members with their ends after having been pushed out of the recesses. In this way all risk of the bars being jammed is obviated.

Alternatively, the bar supply device may be continuously driven instead of intermittently as hereinbefore described.

What I claim is:

1. In an apparatus for producing dried dough strings such as spaghetti and macaroni, an extrusion head having a plurality of sizing openings for feeding dough strings in a web of spaced strings, a movable drying grate, loose grate bars insertable in said grate for being conveyed toward the delivery end of the apparatus, a grate bar supply device, arranged in advance of said grate, and having means for successively advancing said bars in contact with the depending outer shanks of said strings and beyond the plane of said web toward said grate and setting said outer shanks in final position of drying on the bar last inserted in said grate, a deflecting device for looping said strings backwardly over said last inserted bar thereby forming inner shanks of said loops prior to said loops being cut to length, and holding means on said grate for clamping said bars to said grate with said inner shanks also depending from said clamped bars in final position of drying.

2. In an apparatus for producing dough strings such as spaghetti and macaroni, an extrusion head having a plurality of sizing openings for feeding dough strings in a web of spaced strings, a movable drying grate, loose grate bars insertable in said grate for being conveyed toward the delivery end of the apparatus, a grate bar supply device arranged in advance of said grate, a pair of rotatable notched bar carrier discs successively moving said bars in contact with the depending outer shanks of said strings beyond the plane of said web toward said grate and setting said outer shanks in final position of drying on the bar last inserted in said grate, an oscillatory deflecting device oscillating in time with the advancing movement of said supply device and looping said strings backwardly over said last inserted bar thereby forming inner shanks on said loops, a cutting device oscillating in time with the advance movement of said supply device and cutting said loops to length after said deflecting device has completed its backward swing, and holding means on said grate for securing said bars to said grate with said inner shanks also depending from said clamped bars in final position of drying.

3. In an apparatus for producing dough strings such as spaghetti and macaroni, an extrusion head having a plurality of sizing openings for feeding dough strings in a web of spaced strings, a movable drying grate, loose grate bars insertable in said grate for being conveyed toward the delivery end of the apparatus, a grate bar supply device, arranged in advance of said grate, positively moving in timed relation with said grate and successively advancing said bars into contact with the depending outer shanks of said strings beyond the plane of said web toward said grate and setting said outer shanks in final position of drying on the bar last inserted in said grate, a deflecting device positively moving in timed relation with said grate and looping said strings backwardly over said last inserted bar thereby forming inner shanks on said loops, a cutting device positively oscillating in timed relation with said grate for cutting said loops to a predetermined length from the dough strings fed after said deflecting device has completed its backward swing, a drive for driving said grate at an infinitely variable speed in adaptation to the velocity of said dough strings fed, and means on said grate for securing said bars to said grate with said inner shanks also depending from said clamped bars in final position of drying.

EMIL GIEZENDANNER.